(12) United States Patent
Depraete

(10) Patent No.: US 9,850,995 B2
(45) Date of Patent: Dec. 26, 2017

(54) HYDROKINETIC TORQUE COUPLING DEVICE FOR A MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 16 days.

(21) Appl. No.: 14/873,343

(22) Filed: Oct. 2, 2015

(65) Prior Publication Data
US 2017/0097079 A1    Apr. 6, 2017

(51) Int. Cl.
*F16H 45/02* (2006.01)
*F16D 25/0635* (2006.01)
*F16D 3/56* (2006.01)

(52) U.S. Cl.
CPC ......... *F16H 45/02* (2013.01); *F16D 25/0635* (2013.01); *F16D 3/56* (2013.01); *F16H 2045/0221* (2013.01)

(58) Field of Classification Search
CPC .................. F16H 45/02; F16H 2045/0221
See application file for complete search history.

(56) References Cited

U.S. PATENT DOCUMENTS

| | | | |
|---|---|---|---|
| 2,551,718 A | 5/1951 | Auten | |
| 4,145,936 A | 3/1979 | Vincent et al. | |
| 5,485,757 A * | 1/1996 | Foxwell | G01L 3/1435 73/862.321 |
| 5,697,261 A | 12/1997 | Mokdad et al. | |
| 5,893,355 A | 4/1999 | Glover et al. | |
| 2003/0106763 A1 | 6/2003 | Kimura et al. | |
| 2015/0369296 A1 | 12/2015 | Lopez-Perez | |

FOREIGN PATENT DOCUMENTS

| | | |
|---|---|---|
| DE | 19729421 A1 | 1/1998 |
| DE | 19919449 A1 | 11/1999 |
| DE | 102004024747 A1 | 12/2005 |
| EP | 1048420 A2 | 11/2000 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |
| FR | 2828543 A1 | 2/2003 |
| FR | 2938030 A1 | 5/2010 |
| FR | 3000155 A1 | 6/2014 |

(Continued)

*Primary Examiner* — Jacob S Scott
(74) *Attorney, Agent, or Firm* — Berenato & White, LLC

(57) ABSTRACT

The invention relates to a hydrokinetic torque coupling device for a motor vehicle, comprising a torque input element (11) intended to be coupled to a crankshaft (1), an impeller wheel (3) rotationally coupled to the torque input element (11) and able to hydrokinetically drive a turbine wheel (4) through a reactor (5), a torque output element (8) intended to be coupled to a transmission input shaft (2), clutch means (10) able to rotationally couple the torque input element (11) and the torque output element (8) in an engaged position, through damping means (21, 25) and able to rotationally uncouple the torque input element (11) and the torque output element (8) in a disengaged position.

20 Claims, 5 Drawing Sheets

(56) References Cited

FOREIGN PATENT DOCUMENTS

| | | | |
|---|---|---|---|
| GB | 1212042 | A | 11/1970 |
| GB | 2235749 | A | 3/1991 |
| GB | 2262795 | A | 6/1993 |
| GB | 2283558 | A | 5/1995 |
| GB | 2284875 | A | 6/1995 |
| GB | 2468030 | A | 8/2010 |
| JP | 09280317 | A | 10/1997 |
| WO | WO9914114 | A1 | 3/1999 |
| WO | WO2004016968 | A1 | 2/2004 |
| WO | WO2011006264 | A1 | 1/2011 |
| WO | WO2014128380 | A1 | 8/2014 |

\* cited by examiner

HYDROKINETIC TORQUE COUPLING DEVICE FOR A MOTOR VEHICLE

FIELD OF THE INVENTION

The present invention relates to a hydrokinetic torque coupling device for a motor vehicle, such as a torque converter, for instance.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or an angular shift α, of the guiding washers 6 relative to the hub 8, is defined relative to a rest position (α=0) wherein no torque is transmitted through damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant a angular offset of the guiding washers 6 relative to the hub 8 (or vice versa).

It can be seen that the representation of function M=f(α) which defines the M torque transmitted through the device according to the α angular shift, comprises a first linear portion of slope Ka (for the low values of the α angular shift) and a second, more important, linear portion of slope Kb (for the high value of the α angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then Ka=(K1·K2)/(K1+K2) and Kb=Ka+K3.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides a hydrokinetic torque coupling device for a motor vehicle comprising a torque input element intended to be coupled to a crankshaft, a turbine wheel, an impeller wheel rotationally coupled to the torque input element and able to hydrokinetically drive the turbine wheel, a torque output element intended to be coupled to a transmission input shaft, damping means, clutch means adapted to rotationally couple the torque input element and the torque output element in an engaged position, through the damping means, and able to rotationally uncouple the torque input element and the torque output element in a disengaged position, with the damping means being adapted to act against the rotation of the torque input element relative to the torque output element, in the engaged position of the clutch means, with the damping means comprising at least one elastic blade which rotates together with the torque output element or the clutch means respectively, and a supporting member carried by the clutch means or the torque output element respectively, with the blade being elastically maintained supported by said supporting member, with said elastic blade being adapted to bend upon rotation of the torque input element relative to the torque output element, in an engaged position, with the supporting means or the elastic blade respectively being mounted on at least one supporting flange being so mounted as to pivot on the torque output element through a rolling bearing such as a ball bearing, for instance.

Such damping means give a characteristic gradual curve, without any break of slope. The invention thus makes it possible to reduce the vibrations generated in operation and provides a high quality of filtration.

Besides, such a hydrokinetic torque coupling device is easy to mount and rather inexpensive.

It should be noted that the words "radial" and "axial" are defined with respect to the hydrokinetic torque coupling device, which is the axis of rotation of the impeller wheel or of the turbine wheel.

It should be noted that a hydrokinetic torque coupling device may be a torque converter when the hydrokinetic torque coupling means comprise an impeller wheel, a turbine wheel and a reactor, or may be a hydrokinetic coupling device when the hydrokinetic torque coupling means have no reactor.

Mounting the supporting flange on the central hub through a bearing provides a frictionless guiding which ensures a frictionless relative rotation while enabling the stresses to be taken over.

The supporting flange may comprise a radially internal part mounted about the torque output element through the bearing, and a radially external part whereon the supporting member is mounted, with the radially internal and external parts being fastened together, by rivets, for instance.

According to one embodiment, the radially internal part of the supporting flange may comprise a cylindrical rim surrounding the bearing.

In another embodiment, the radially internal part of the supporting flange may comprise a shoulder delimiting a cylindrical surface extending at one end into a radial surface, with the bearing being accommodated in said shoulder and adapted to rest on the radial surface of said shoulder.

The hydrokinetic torque coupling device may comprise at least one internal flange which rotates together with the torque output element and at least one radially external flange positioned radially at least partially outside the internal flange, and pivoting relative to the internal flange, with the elastic blade rotating together with the internal flange, respectively the external flange, with the supporting member being connected to the external flange, respectively the internal flange.

Besides, the hydrokinetic torque coupling device may comprise two radially internal flanges rotating together with the torque output element and two radially external flanges so mounted as to pivot about said internal flanges, with the elastic blade being mounted in a space axially arranged between the internal flanges and/or between the external flanges, with the supporting member being mounted in a space axially arranged between the external flanges, respectively the internal flanges, with one of the external flanges being formed by the supporting flange.

The turbine wheel may be rotationally coupled to the torque output element and to the internal flange.

The clutch means may comprise at least one piston rotationally coupled to the supporting flange, with the piston being able to move between an engaged position wherein it is rotationally coupled to the torque input element and a disengaged position wherein it is rotationally uncoupled from the torque input element.

The torque output element then comprises a radial surface, with the motion of the piston in the engaged position being limited by the piston resting on said radial surface of the torque output element.

Besides, the torque output element may comprise a central hub.

The bearing may be a rolling bearing or a ring, for instance a guiding ring made of plastic or bronze, or more generally a ring having a low coefficient of friction comprising a non-stick coating. Such a ring may be mounted, through a friction-type connection, on the supporting flange or on the torque output element.

Besides, the hydrokinetic torque coupling device may comprise a reactor, with the impeller wheel being adapted to hydrokinetically drive the turbine wheel through the reactor. The hydrokinetic torque coupling device thus forms a hydrodynamic torque converter.

The hydrokinetic torque coupling device may also comprise one or more of the following characteristics:
  the supporting member comprises at least one rolling body, such as a roller so mounted as to pivot about a shaft, for instance through a rolling bearing, such as a needle bearing, for instance.
  the supporting member is mounted on the radially external periphery of the supporting flange,
  the impeller wheel is rotationally coupled to a cover wherein the impeller wheel, the turbine wheel, the reactor and/or the damping means are at least partially accommodated.
  the torque input element comprises said cover,
  the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
  the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
  in the engaged position, the angular displacement of the torque input element relative to the torque output element is greater than 20° and preferably greater than 40°.
  the elastic blade comprises a fastening portion and an elastic portion comprising a radially internal strand, a radially external strand and a bowed or bent portion connecting the internal 31a and the external strand.
  the damping means comprise at least two elastic leaves, with each elastic blade rotating together with the torque output element, or the torque input element in engaged position respectively, with each blade being associated with a supporting element rotationally linked with the torque input element in engaged position, or the torque output element respectively, with each blade being elastically maintained supported by said matching supporting element, with each elastic blade being adapted to bend upon rotation of the torque input element relative to the torque output element in engaged position.
  the impeller wheel is rotationally coupled to the torque input element and is adapted to hydrokinetically drive the turbine wheel, through a reactor.
  the turbine wheel and the flange are rotationally connected to the central hub by a common fastening means or are each rotationally connected to the central hub by a different fastening means.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
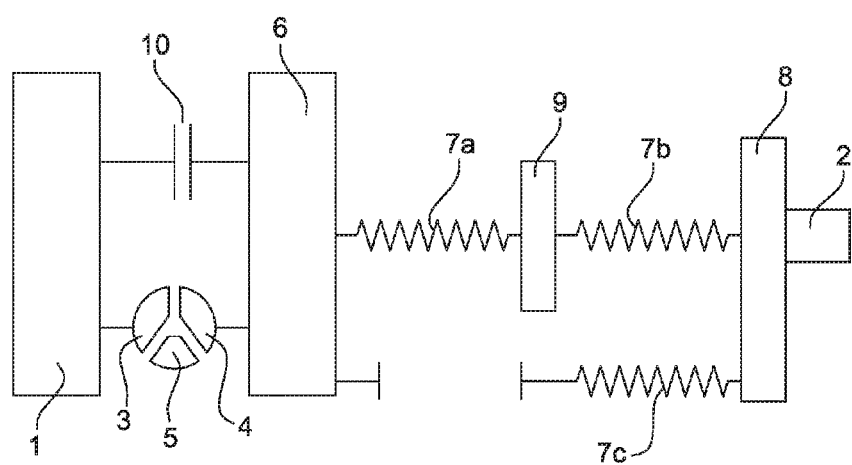
FIG. 1 is a schematic representation of a torque converter of the prior art.
Figure 2:
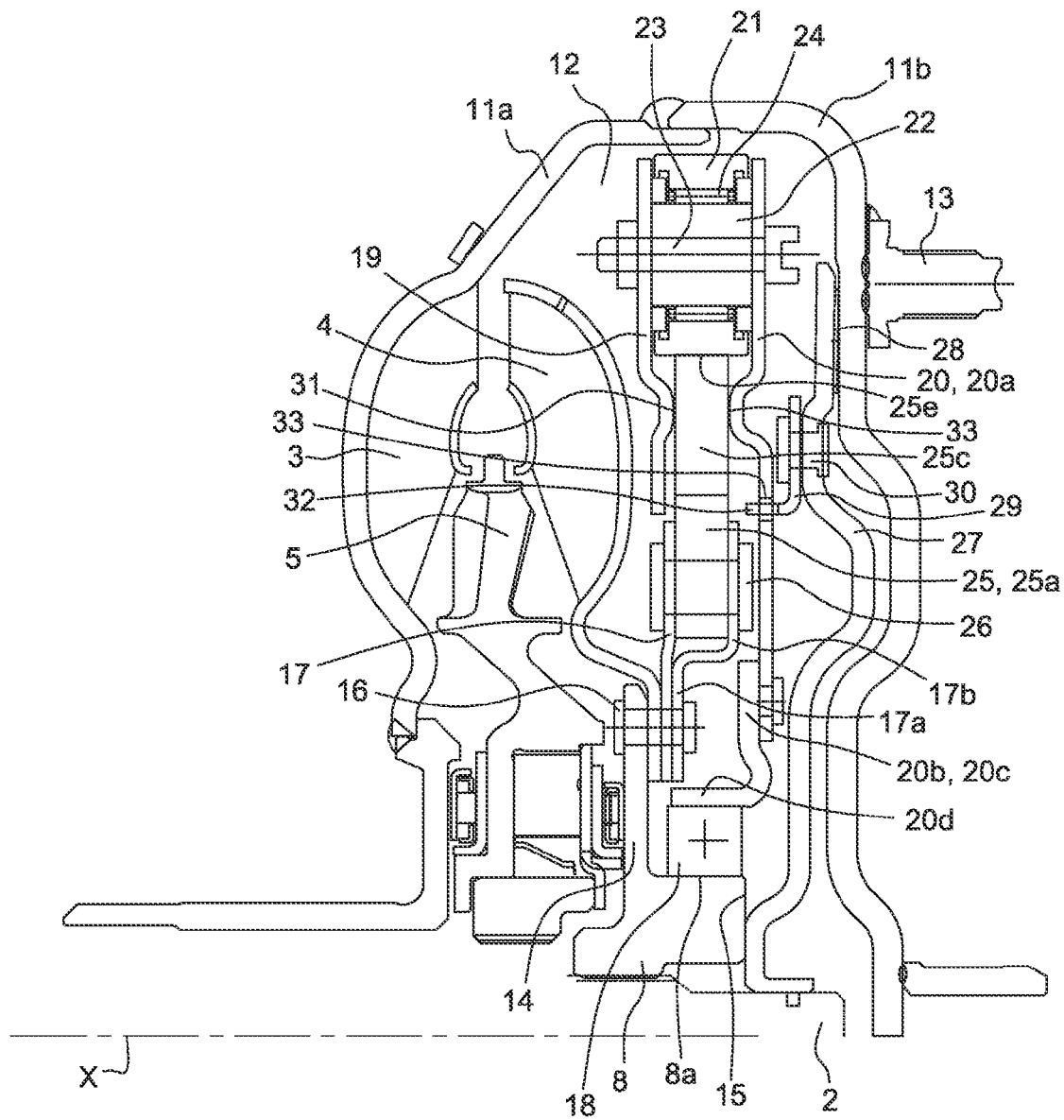
FIG. 2 is a sectional view along an axial plane, of a torque converter according to a first embodiment of the invention.
Figure 3:
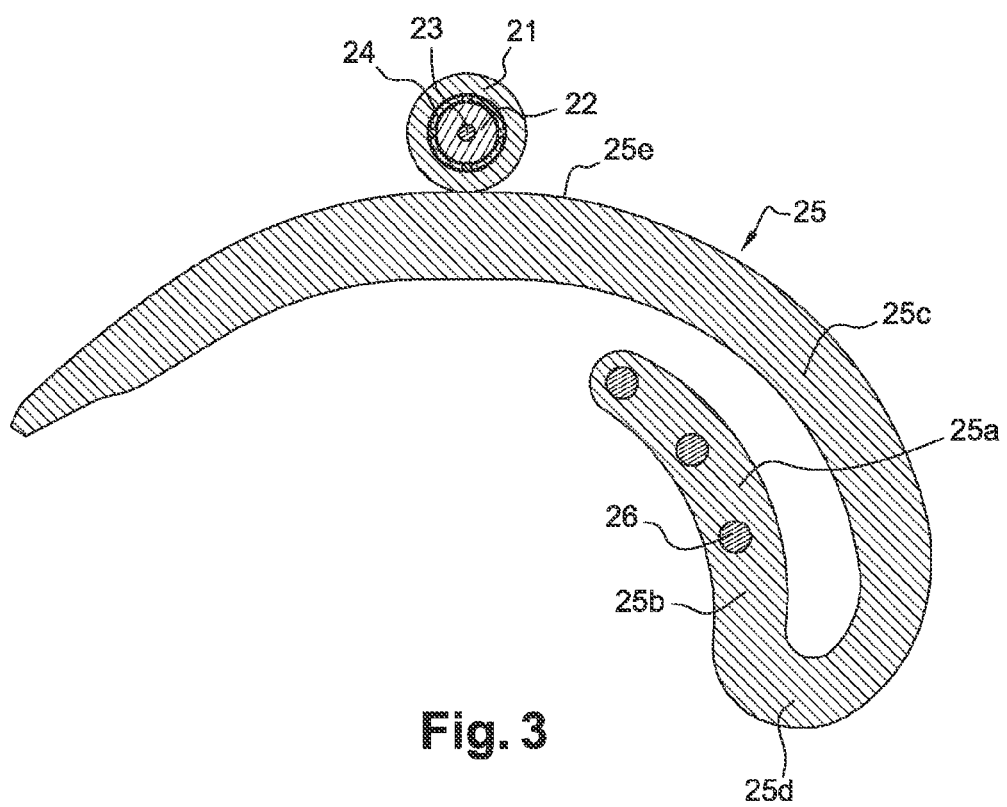
FIG. 3 is a sectional front view illustrating a supporting member and an elastic blade of a torque converter according to the invention.

A hydrokinetic torque coupling device according to a first embodiment of the invention is shown in FIGS. 2 and 3. The hydrokinetic torque coupling device is more particularly a hydrodynamic torque converter. Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

The torque converter conventionally comprises an impeller wheel 3, able to hydrokinetically drive a turbine bladed wheel 4 through a reactor 5.

The impeller wheel 3 is fastened to a cover consisting of two bell-shaped parts 11a, 11b assembled together by welding and defining an internal volume 12 accommodating the impeller wheel 3, the turbine wheel 4 and the reactor 5. Said cover 11a, 11B, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises an annular rim 14 which radially extends outwards and a front end, facing the turbine wheel, which forms a radial surface 15.

The turbine wheel 4 is fastened to the first annular rim 14 of the central hub 8, for instance by rivets 16 or by welding.

Two radially internal annular flanges 17 are mounted in said internal volume 12, with the two flanges 17 being fastened by their radially internal periphery to the rim 14 of the hub 8 by rivets 16, as mentioned above, or by welding, for instance.

The flanges 17 radially extend and comprise each a radially internal portion 17a and a radially external portion 17b. The radially internal portions 17a of both flanges 17 are axially closer to each other than the radially external portions 17b of both flanges.

Two radially external annular flanges 19, 20 are further mounted in the internal volume 12 of the cover 11 around the internal flanges 17. The external flanges 19, 20 are fastened together as will be described in greater details hereunder, The external flange 19 positioned behind or in the vicinity of the turbine wheel 4 is totally positioned radially outside the internal flanges 17. The external flange 20 positioned on the front, partially extends radially beyond the internal flanges 17 and partially extends radially opposite said internal flanges 17. The external flange 20 more specifically comprises a first radially internal part 20a, and a second radially external part 20b fastened together by rivets, for instance. The second part 20b of the flange 20 comprises a radial zone 20c fixed to the first part 20a and a cylindrical rim 20d mounted about a cylindrical part 8a of the central hub 8 through a rolling bearing 18, such as a ball bearing, for instance. The cylindrical rim 20d for example surrounds the external ring of the rolling bearing 18.

Two supporting members or rolling bodies 21 shaped as rollers or cylindrical rollers, are fixed on the radially external periphery of the external flanges 19, 20. The rolling bodies 21 are positioned so as to be diametrically opposed. The rolling bodies 21 are more specifically mounted about shafts 22 which axially extend between the two external flanges, with said shafts being mounted on the external flanges 19, 20 using bolts 23 or rivets, for instance. The rolling bodies 21 are mounted on the shafts 22 through rolling bearings 24, such as needle bearings, for instance.

The shafts 22 form spacers which make it possible to preserve the spacing between the external flanges 19, 20 with the latter being fastened together at least by bolts 23 or matching rivets.

Two elastic leaves 25 are mounted between the internal and the external flanges. As can be best seen in FIG. 3, each elastic blade 25 more specifically comprises a fastening portion 25a mounted between the radially external parts 17b of both internal flanges 17 and fastened to the latter by rivets 26, here three in number for each blade 25, and an elastic portion comprising a radially internal strand 25b, a radially external strand 25c, and a bowed or bent portion 25d connecting the internal strand 25b and the external strand 25c. The bowed or bent portion 25d has an angle of approximately 180°. In other words, the elastically deformable portion of the elastic blade 25 comprises two regions radially shifted relative to each other and separated by a radial space.

The external strand 25c develops on the circumference with an angle ranging from 120° to 180°. The radially external strand 25c comprises a radially external surface 25e which forms a raceway supported by the corresponding rolling body 21, with said rolling body 21 being positioned radially outside the external strand 25c of the elastic blade 25. The raceway 25e has a globally convex shape. The raceway 25e may directly consist of a zone of the external strand 25c or of a part which is added onto said external strand 25c.

Each external strand 25c is adapted to axially rest on opposite radial surfaces 31 of the external flanges 19, 20.

Between each elastic blade 25 and the matching rolling body 21, the transmitted torque is broken down into radial stresses and peripheral stresses. Radial stresses make it possible for the matching blade 25 to bend and peripheral stresses make it possible for the matching rolling body 21 to move on the raceway 25e of the blade 25 and to transmit the torque.

The torque converter further comprises clutch means 10 adapted to rotationally couple the cover 11 and the external flanges 19, 20 in the engaged position, and adapted to release the cover 11 of the external flanges 19, 20 in a disengaged position.

The clutch means 10 comprise an annular piston 27 which extends radially and is accommodated in the inner space 12 of the cover 11, the radially external periphery of which comprises a resting area equipped with clutch lining 28 and adapted to rest on the part 11b of the cover 11 in an engaged position, so as to provide a rotational coupling of the cover 11 and the piston 27.

A linking member 29 is fastened to the piston, for instance by rivets, in a zone positioned radially inside the clutch lining 28. The linking member 29 and the cover 11 may of course consist of one single part, without the operation of the torque converter being affected.

The linking member 29 comprises at least protruding zones 32 engaged in recessed zones 33 of the flange 20. More particularly, the protruding parts are lugs 32 formed by cutting and folding the linking member for instance.

The piston 27 is thus rotationally coupled to the external flanges 19, 20 while enabling the axial motion of the piston 27 relative to the flange 20 between the engaged and disengaged positions thereof. The motion of the piston 27 is controlled by pressure chambers positioned on either side of the piston 27. Besides, the motion of the piston 27 in the disengaged position may be limited by the radially internal periphery of the piston 27 resting on the radial surface 15 of the central hub 8.

It should be noted that, in this embodiment, the piston 27 can be so mounted as to pivot directly about the transmission input shaft 2.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 27, the torque goes through the hydrokinetic coupling means, i.e. the impeller wheel 3 and then the turbine wheel 4 fixed to the flange 8. The torque is then transmitted to the transmission input shaft 2 coupled to the hub through the internal ribs of the hub 8.

In the engaged position of the piston 27, the torque from the cover 11 is transmitted to the external flanges 19, 20, then to the internal flanges 17 through the damping means formed by the elastic leaves 25 and by the supporting members 21. The torque is then transmitted to the internal hub 8 whereon the internal flanges 17 are fastened, then to the transmission input shaft 2 coupled to the hub 8 through the internal ribs of said hub 8.

In the engaged position of the piston 27, when the torque transmitted between the cover 11 and the hub 8 varies, the radial stresses exerted between each elastic blade 25 and the matching rolling body 21 vary and the bending of the elastic blade 25 is modified. The modification in the bending of the blade 25 comes with a motion of the rolling body 21 along the matching raceway 25e due to peripheral stresses.

The raceways 25e have profiles so arranged that, when the transmitted torque increases, the rolling bodies 21 each exert a bending stress on the matching elastic blade 25 which causes the free distal end of the elastic blade 25 to move towards the X axis and a relative rotation between the cover 11 and the hub 8 such that the later move away from their relative rest position. Rest position means the relative position of the flange 11 relative to the hub 8, wherein no torque is transmitted between the latter.

The profiles of the raceways 25e are thus such that the rolling bodies 21 exert bending stresses having radial components and circumferential components onto the elastic leaves 25.

The elastic leaves 25 exert, onto the rolling bodies 21, a backmoving force having a circumferential component which tends to rotate the rolling bodies 21 in a reverse direction of rotation and thus to move back the turbine wheel 4 and the hub 8 towards their relative rest position, and a radial component directed outwards which tends to maintain the raceway 25e supported by the matching rolling body 21.

When the flange 11 and the hub 8 are in their rest position, the elastic leaves 25 are preferably radially pre-stressed toward the X axis so as to exert a reaction force directed radially outwards, so as to maintain the leaves 25 supported by the rolling bodies 21.

The profiles of the raceways 25e may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 25 are regularly distributed around the X axis and are symmetrical relative to the X axis so as to ensure the balance of the torque converter.

The torque converter may also comprise friction means so arranged as to exert a resisting torque between the flange 11 and the hub 8 during the relative displacement thereof so as to dissipate the energy stored in the elastic leaves 25.

Figure 4:
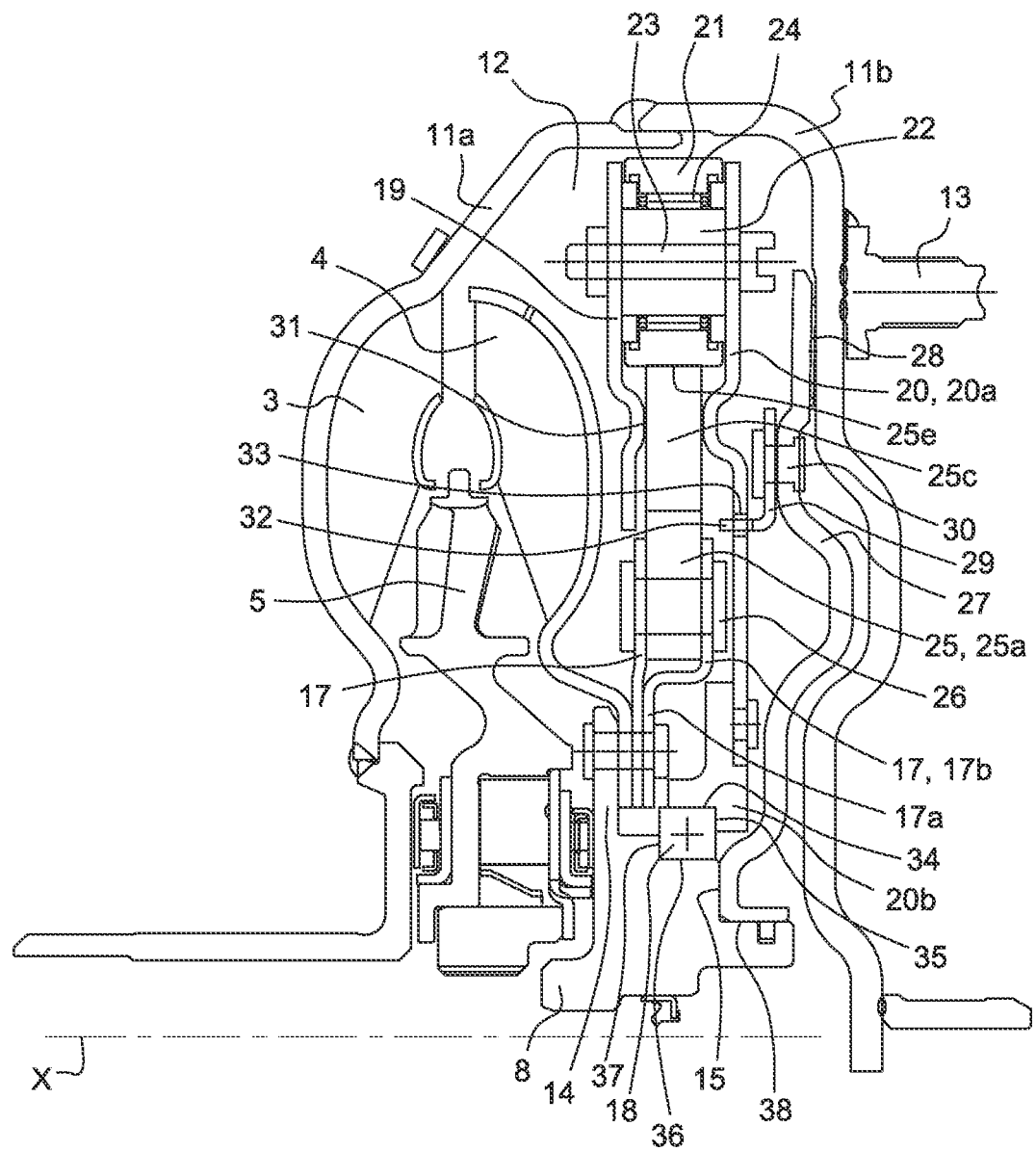
FIG. 4 is a view corresponding to FIG. 2, illustrating a torque converter according to a second embodiment of the invention.

FIG. 4 shows a second embodiment of the invention, which is different from the one shown in FIGS. 2 and 3 in that the second part 20b of the flange 20 comprises a shoulder delimiting a cylindrical surface 34 extending at its front end in a radial surface 35, with the rolling bearing 18 being accommodated in said shoulder and adapted to rest on the radial surface 35 of said shoulder.

The central hub 8 further comprises a shoulder delimiting a cylindrical surface 36 extending at its rear end in a radial surface 37, with the rolling bearing 18 being accommodated in the shoulder of the central hub 8 and being adapted to rest on the matching radial surface 37.

In this embodiment too, the piston 27 can be mounted around a cylindrical part 38 of the central hub 8 formed at the front end of said hub 8 for instance. The radial surface 15 supporting the piston 27 in the disengaged position is formed behind the above-mentioned cylindrical part.

Figure 5:
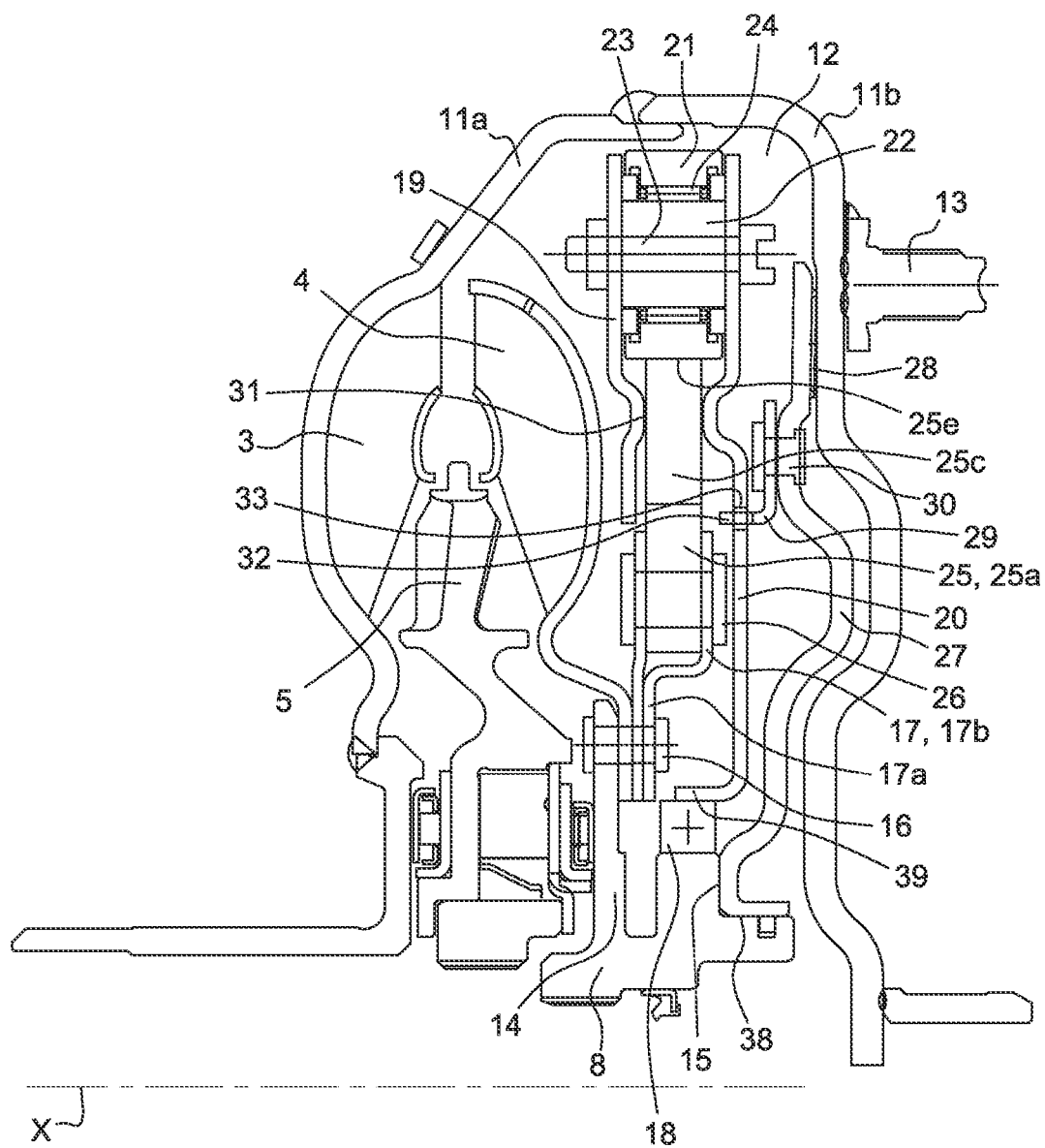
FIG. 5 is a view corresponding to FIG. 2, illustrating a torque converter according to a third embodiment of the invention.

FIG. 5 shows a third embodiment of the invention which is different from the one shown in FIGS. 2 and 3 in that the flange 20 is formed in one single part, the radially internal periphery of which comprises a rim 39 surrounding the rolling bearing 18. Besides, in this embodiment, the piston 27 can be mounted around a cylindrical part 38 of the central hub 8 formed at the front end of said hub 8 for instance. The radial surface 15 supporting the piston 27 in the disengaged position is formed behind the above-mentioned cylindrical part 38.

The invention claimed is:

1. A hydrokinetic torque coupling device for a motor vehicle comprising
   a torque input element (11) intended to be coupled to a crankshaft (1);
   a turbine wheel (4), an impeller wheel (3) rotationally coupled to the torque input element (11) and able to hydrokinetically drive the turbine wheel (4), a torque output element (8) intended to be coupled to a transmission input shaft (2);
   damping means (21, 25), clutch means (10) adapted to rotationally couple the torque input element (11) and the torque output element (8) in an engaged position, through the damping means (21, 25), and able to rotationally uncouple the torque input element (11) and the torque output element (8) in a disengaged position, with the damping means (21, 25) being adapted to act against the rotation of the torque input element (11) relative to the torque output element (8), in the engaged position of the clutch means (10); and,
   the damping means (21, 25) comprising at least an elastic blade (25) which rotates together with the torque output element (8), and a supporting member (21) carried by the clutch means (10), with the blade (25) being elastically maintained against said supporting member (21), with said elastic blade (25) being adapted to bend upon rotation of the torque input element (11) relative to the torque output element (8), in an engaged position, with the supporting member (21) being mounted on at least one supporting flange (20) and so mounted as to pivot on the torque output element (8) through a bearing (18).

2. A hydrokinetic torque coupling device according to claim 1, wherein the supporting flange (20) comprises a radially internal part (20b) mounted about the torque output element (8) through the bearing (18), and a radially external part (20*a*) whereon the supporting member (21) is mounted, with the radially internal and external parts (20*b*, 20*a*) being fastened together.

3. A hydrokinetic torque coupling device according to claim 2, wherein the radially internal part (20*b*) of the supporting flange (20) comprises a cylindrical rim (20*d*) surrounding the bearing (18).

4. A hydrokinetic torque coupling device according to claim 2, wherein the radially internal part (20*b*) of the supporting flange (20) comprises a shoulder delimiting a cylindrical surface (34) extending at one end into a radial surface (35), with the bearing (18) being accommodated in said shoulder and adapted to rest on the radial surface (35) of said shoulder.

5. A hydrokinetic torque coupling device according to claim 1, wherein it comprises:
  at least one internal flange (17) which rotates together with the torque output element (8); and,
  at least one radially external flange (19, 20) positioned radially partially outside the internal flange, and pivoting relative to the internal flange (17), with the elastic blade (25) rotating together with the internal flange (17), and the external flange (19, 20), rotating with and being connected to the supporting member (21).

6. A hydrokinetic torque coupling device according to claim 1, wherein it comprises:
  two radially internal flanges (17) rotating together with the torque output element (8); and,
  two radially external flanges (19, 20) mounted so as to pivot about said internal flanges (17), with the elastic blade (25) being mounted in a space axially arranged between the internal flanges (17) and between the external flanges (19, 20), with the supporting member (21) being mounted in a space axially arranged between the external flanges (19, 20), with one of the external flanges (19, 20) being formed by the supporting flange (20).

7. A hydrokinetic torque coupling device according to claim 1, wherein the turbine wheel (4) is rotationally coupled to the torque output element (8) and to the internal flange (17).

8. A hydrokinetic torque coupling device according to claim 1, wherein the clutch means (10) comprise at least one piston (27) rotationally coupled to the supporting flange (20), with the piston (27) being able to move between an engaged position wherein it is rotationally coupled to the torque input element (11) and a disengaged position wherein it is rotationally uncoupled from the torque input element (11).

9. A hydrokinetic torque coupling device according to claim 8, wherein the torque output element (8) comprises a radial surface (15), with the motion of the piston (27) in the engaged position being limited by the piston (27) resting on said radial surface (15) of the torque output element (8).

10. A hydrokinetic torque coupling device according to claim 1, wherein the torque output element comprises a central hub (8).

11. A hydrokinetic torque coupling device according to claim 1, wherein the bearing is a rolling bearing (18).

12. A hydrokinetic torque coupling device according to claim 1, wherein the bearing is a ring.

13. A hydrokinetic torque coupling device according to claim 1, wherein it comprises a reactor (5), with the impeller wheel (3) being able to hydrokinetically drive the turbine wheel (4) through the reactor (5).

14. A hydrokinetic torque coupling device according to claim 2, wherein it comprises:
  at least one internal flange (17) which rotates together with the torque output element (8); and,
  at least one radially external flange (19, 20) positioned radially partially outside the internal flange, and pivoting relative to the internal flange (17), with the elastic blade (25) rotating together with the internal flange (17), and the external flange (19, 20), rotating with and being connected to the supporting member (21).

15. A hydrokinetic torque coupling device according to claim 3, wherein it comprises:
  at least one internal flange (17) which rotates together with the torque output element (8); and,
  at least one radially external flange (19, 20) positioned radially partially outside the internal flange, and pivoting relative to the internal flange (17), with the elastic blade (25) rotating together with the internal flange (17), and the external flange (19, 20), rotating with and being connected to the supporting member (21).

16. A hydrokinetic torque coupling device according to claim 4, wherein it comprises:
  at least one internal flange (17) which rotates together with the torque output element (8); and,
  at least one radially external flange (19, 20) positioned radially partially outside the internal flange, and pivoting relative to the internal flange (17), with the elastic blade (25) rotating together with the internal flange (17), and the external flange (19, 20), rotating with and being connected to the supporting member (21).

17. A hydrokinetic torque coupling device according to claim 2, wherein it comprises:
  two radially internal flanges (17) rotating together with the torque output element (8); and,
  two radially external flanges (19, 20) mounted so as to pivot about said internal flanges (17), with the elastic blade (25) being mounted in a space axially arranged between the internal flanges (17) and between the external flanges (19, 20), with the supporting member (21) being mounted in a space axially arranged between the external flanges (19, 20), with one of the external flanges (19, 20) being formed by the supporting flange (20).

18. A hydrokinetic torque coupling device according to claim 3, wherein it comprises:
  two radially internal flanges (17) rotating together with the torque output element (8); and,
  two radially external flanges (19, 20) mounted so as to pivot about said internal flanges (17), with the elastic blade (25) being mounted in a space axially arranged between the internal flanges (17) and between the external flanges (19, 20), with the supporting member (21) being mounted in a space axially arranged between the external flanges (19, 20), with one of the external flanges (19, 20) being formed by the supporting flange (20).

19. A hydrokinetic torque coupling device according to claim 4, wherein it comprises:
  two radially internal flanges (17) rotating together with the torque output element (8); and,
  two radially external flanges (19, 20) mounted so as to pivot about said internal flanges (17), with the elastic blade (25) being mounted in a space axially arranged between the internal flanges (17) and between the external flanges (19, 20), with the supporting member (21) being mounted in a space axially arranged between the external flanges (19, 20), with one of the external flanges (19, 20) being formed by the supporting flange (20).

20. A hydrokinetic torque coupling device according to claim 5, wherein it comprises:
- two radially internal flanges (17) rotating together with the torque output element (8); and,
- two radially external flanges (19, 20) mounted so as to pivot about said internal flanges (17), with the elastic blade (25) being mounted in a space axially arranged between the internal flanges (17) and between the external flanges (19, 20), with the supporting member (21) being mounted in a space axially arranged between the external flanges (19, 20), with one of the external flanges (19, 20) being formed by the supporting flange (20).

\* \* \* \* \*